US006959048B1

(12) United States Patent
Horneman et al.

(10) Patent No.: US 6,959,048 B1
(45) Date of Patent: Oct. 25, 2005

(54) OPTIMIZING LINK QUALITY BY SPACE AND TIME INTERLEAVING

(75) Inventors: Kari Horneman, Oulu (FI); Marcos Katz, Oulu (FI); Juha Ylitalo, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/857,488

(22) PCT Filed: Oct. 19, 1999

(86) PCT No.: PCT/FI99/00867

§ 371 (c)(1),
(2), (4) Date: Jun. 6, 2001

(87) PCT Pub. No.: WO01/29986

PCT Pub. Date: Apr. 26, 2001

(51) Int. Cl.$^7$ ......................... H04L 27/04; H04L 27/12; H04L 27/20
(52) U.S. Cl. ....................... 375/299; 455/101; 455/103
(58) Field of Search ............................... 375/146, 135, 375/267, 299, 316; 455/101, 103

(56) References Cited

U.S. PATENT DOCUMENTS

| | | | |
|---|---|---|---|
| 5,859,870 A | 1/1999 | Tsujimoto | 375/143 |
| 6,298,092 B1 * | 10/2001 | Heath, Jr. et al. | 375/267 |
| 6,353,638 B1 * | 3/2002 | Hottinen et al. | 375/260 |
| 6,430,231 B1 * | 8/2002 | Calderbank et al. | 375/295 |
| 6,510,173 B1 * | 1/2003 | Garmonov et al. | 375/141 |
| 6,661,856 B1 * | 12/2003 | Calderbank et al. | 375/347 |
| 6,678,263 B1 * | 1/2004 | Hammons, Jr. et al. | 370/342 |

FOREIGN PATENT DOCUMENTS

| | | |
|---|---|---|
| EP | 722 227 | 7/1996 |
| EP | 755 130 | 1/1997 |
| WO | WO 99/05798 | 2/1999 |

OTHER PUBLICATIONS

Anthony C.K. Soong, et al., "Effect of Antenna Diversity on Performance of Reference Symbol Assisted Interference Cancellation in CDMA Wireless Systems," IEEE, pp. 202-207 (1997).
European Office Action dated Apr. 13, 2005.

* cited by examiner

*Primary Examiner*—Tesfaldet Bocure
*Assistant Examiner*—Juan Alberto Torres
(74) *Attorney, Agent, or Firm*—Pillsbury Winthrop Shaw Pittman LLP

(57) ABSTRACT

The invention relates to a method of transmitting data in a radio channel from a transmitter to a receiver, and to a transmitter and a receiver implementing the method. The method includes setting a radio channel quality requirement according to the user and system information; setting a data transfer delay requirement; determining a radio channel coherence time; channel encoding the data; selecting interleaving depth using the radio channel coherence time and the data transfer delay as decisive parameters; interleaving the channel coded data; if the radio channel quality requirement is not fulfilled, selecting at least one transmit diversity antenna besides the main antenna so that the radio channel quality requirement will be fulfilled; transmitting modulated, interleaved and channel coded data with the selected antennas.

32 Claims, 5 Drawing Sheets

OPTIMIZING LINK QUALITY BY SPACE AND TIME INTERLEAVING

Figure 1A:
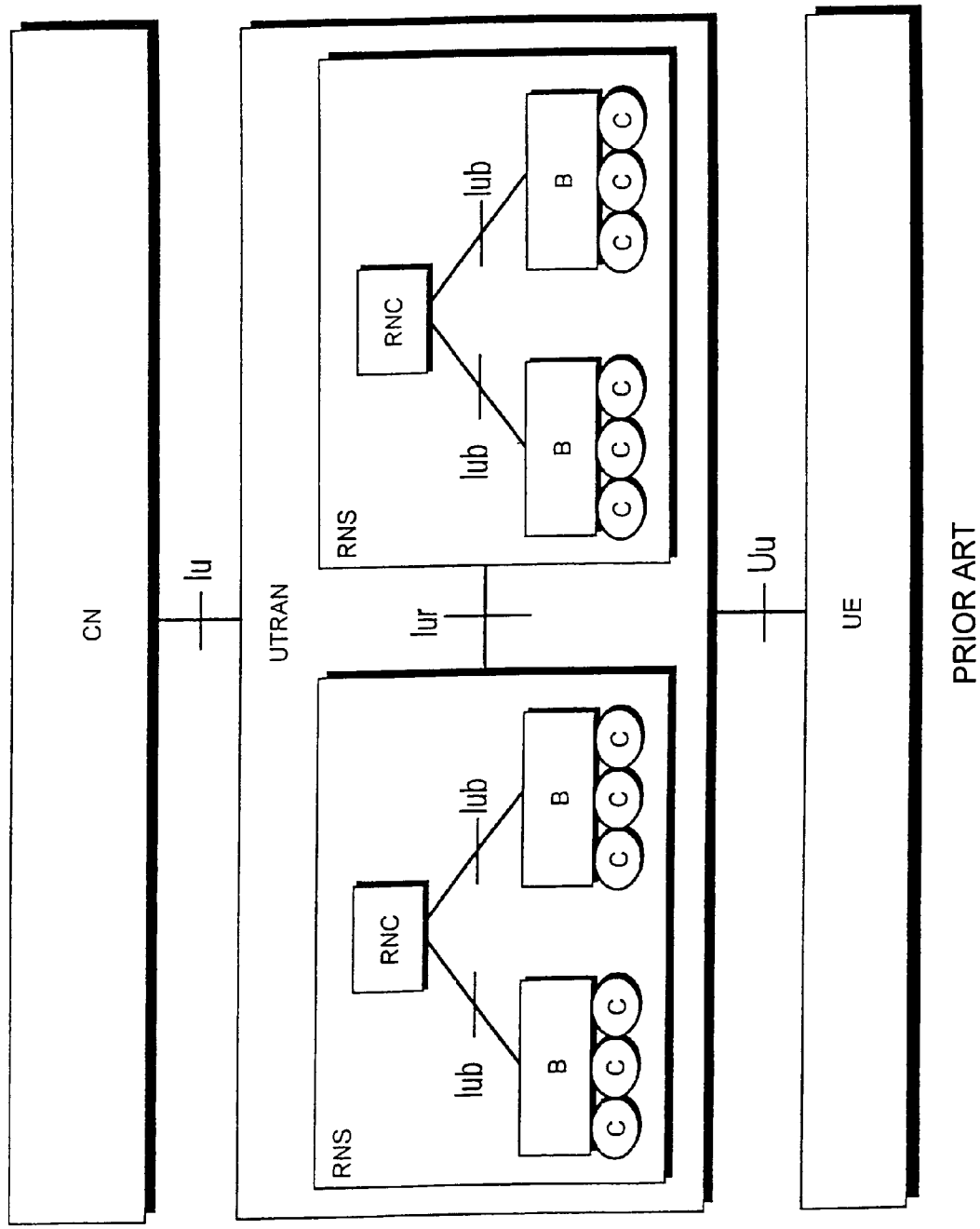

This application is the National Phase of International Application PCT/FI99/00867 filed Oct. 19, 1999 which designated the U.S. and that International Application was published under PCT Article 21(2) in English.

FIELD OF THE INVENTION

The invention relates to a method of transmitting data in a radio channel from a transmitter to a receiver, and to a transmitter and a receiver implementing the method.

DESCRIPTION OF THE BACKGROUND ART

In conventional transmission of digital information the signal to be transmitted is protected against the effect of noise by the use of some sort of redundancy. The importance of coding as a way of improving the transmission reliability has been recognized from the very beginning of the digital communication era. At the receiving end the decision on a particular bit received is made on the basis of processing protected or coded signal, for example by considering repeated samples of the same piece of information. Assuming the noise affecting each sample is uncorrelated, then the total effect of the added redundancy reinforces the desired signal while averaging out the effect of the noise. The reliability of the decision made by the receiver is greatly increased when the signal to be transmitted is previously coded and this is clearly reflected as an increase in the performance of the digital link, e.g. as a reduced bit error rate. In general, channel coding provides the necessary protection against the degrading effect of Additive White Gaussian Noise (AWGN). This is carried out by exploiting temporal diversity, the principle used by conventional coding schemes.

When the effects of (fast) fading channels are taken into account, additional care is needed to keep performance figures comparable to those of a channel with only noise. Indeed, fading tends to modify adjacent transmitted bits approximately in the same proportion. It follows that any coding protection, including error correcting codes, will fail to protect the information transmitted when successive bits of a signal are affected by a highly correlated fading envelope. In order to exploit any conventional coding scheme the temporal structure of the bits to be transmitted has to be altered. In this fashion the correlated fading will now affect consecutive bits corresponding to non-successive signal bits. If the temporal structure is changed in a predetermined order, the received bits can be easily restructured by an inverse operation to produce a bit stream in the same order as the originally transmitted. Then channel decoding can take place as usually. The above time domain operations are known as (bit) interleaving at the transmitting end and deinterleaving at the receiving end. Interleaving is usually carried out by writing the coded bits into a matrix in a row-wise fashion and reading the bits to be transmitted in a column-wise fashion. It should be noted that the interleaving-deinterleaving operation imposes an inherent delay to the signal. For an r×q interleaving matrix, the signal will be delayed by an equivalent time corresponding to rq bits. In slowly changing environments, the fading envelope will be correspondingly slow and conversely, the coherence time will be large. The slower the fast-fading envelope, the more consecutive bits are involved (or correlated) with the fading and the larger should be the interleaving depth to provide effective protection.

In radio environments characterized by low mobility, e.g. indoor cells, the coherence time of the channel is large, typically at least hundreds of milliseconds. Coherence time reflects the change speed of the channel, and it can be said that the coherence time defines how far apart the bits should be placed in interleaving, so that their cross correlation is small enough in case of a fading channel. The fading depths are correspondingly long and thus the large interleaving depth required to provide enough protection could result in excessively long delays. Many applications are delay sensitive in the sense that large delays will affect the quality of the transmission. This is directly related with real-time applications like speech and video traffic, where long delays could be unacceptable. In addition, system constraints may also limit the maximum amount of used interleaving depth, especially with high-bit-rate users. In fact, long delays in conjunction with high-bit-rate traffic could require excessively large signal buffering capabilities at both ends. In summary, in low mobility radio environments the use of interleaving implies unacceptably long processing delays in many cases. The problem becomes more serious for higher bit rates. The importance of this problem can be seen from the fact that the above scenarios are typical for WCDMA (Wide-band Code Division Multiple Access) systems operating in pico/micro cells.

The envelope delay correlation of the signal received by the mobile station can be approximated by:

$$\rho(\tau) = J^2_0(\beta v \tau), \qquad (1)$$

where $\tau$ is the time delay of interest, $J_0$ is the Bessel function, $v$ is the mobile station velocity and $\beta = 2\pi/\lambda$, $\lambda$ being the wavelength of the signal. The first zero (corresponding to the minimum delay with zero correlation) of the Bessel function occurs for an argument of approximately 2.4. As an example, the delay correlation (this figure is comparable to the coherence time of the channel) for a 2 GHz radio channel where a mobile station is nearly stationary or moves very slowly (v<1 Km/h) is larger than about 200 milliseconds. Assuming that an interleaving depth of the same order is used, then for a 2M bit/s signal at least some 400K signal bits have to be buffered. This could easily be well beyond the processing capacity of the terminal equipment.

The interleaving is utilized primarily to decorrelate the effect of fast fading on contiguous bits of information. However, an equivalent effect can be achieved by transmitting these adjacent bits from different antennas. The decorrelating effect achieved with the temporal interleaving can be replaced or extended in principle by using equivalent spatial processing or spatial interleaving. It should be noted that in order to obtain a duality in the spatial and temporal behaviour, the transmitting antennas have to produce correspondingly uncorrelated signals at the receiving end. Fortunately, this is quite true in pico/micro cells due to their typically large angular spreads, also in macrocells if antenna separation is adequately large or polarization diversity is applied. The same principle expressed by equation 1 can be extended to the spatial domain, in order to obtain the following space correlation expression:

$$\rho(d) = J^2_0(\beta d), \qquad (2)$$

where d represents spatial separation. Again, the separation for zero correlation results in a required spatial separation $d=0.38\lambda$ ($\beta d=2.4$), assuming the classical Doppler spectrum. It is important to emphasize that equivalent decorrelating effects can be obtained in the time domain when $\rho(\tau)=0$ (equation 1) and in the space domain when $\rho(d)=0$ (equation 2).

BRIEF DESCRIPTION OF THE INVENTION

The present invention seeks to provide an improved method of transmitting data in a radio channel from a transmitter to a receiver, an improved transmitter, and an improved receiver. According to an aspect of the present invention, there is provided a method of transmitting data in a radio channel from a transmitter to a receiver as specified in claim 1. According to an aspect of the present invention, there is provided a transmitter as specified in claim 17. According to an aspect of the invention, there is provided a receiver as specified in claim 33. The preferred embodiments of the invention are claimed in the dependent claims.

The idea behind the invention proposed here is to adaptively exchange resources in temporal and spatial domains with a first aim of keeping the processing delay within acceptable limits. If, due to the slowness of a given radio channel, the interleaving delay required to give enough protection is too large, the spatial domain is taken into use. In other words, the proposed scheme attains a given link quality or maximum link delay by adaptively combining spatial and temporal resources. The distinctive characteristic of the presented method is the flexibility brought by its adaptability. Resources are conveniently selected to accomplish a final aim, such as a given link quality, a particular maximal allowed processing delay, etc. The resource selection process also takes into account the available resources at the transmitting end as well as the characteristics of each particular radio channel.

TABLE 1

| | |
|---|---|
| Inputs | Radio environment information |
| | Equipment level information |
| | Network level information |
| | User level information |
| Resources | Depth of spatial interleaving |
| | Depth of temporal interleaving |
| Final objectives | Link quality |
| | Processing delay |

Table 1 shows the factors involved in the decision of the resources to be exploited, namely temporal and spatial interleaving. It is assumed that the coding resources can provide a finite number of combinations of spatial and temporal interleaving. The selection of a particular ST (Space Time) interleaving combination is done by a decision algorithm. The algorithm attempts to fulfill a predefined criterion (e.g. link performance, processing delays) and in order to do that it exploits input information. The input may include radio environment information (e.g. estimated channel impulse response, angle, frequency and delay spreads), user level information (e.g. quality requirements, user priority, traffic type), network level information (e.g. co-channel user information) and equipment level information (e.g. available physical resources, loading condition of power amplifiers). In addition, feedback information from the desired mobile station can also be used to control the coding scheme decision process.

THE LIST OF DRAWINGS

Figure 1B:
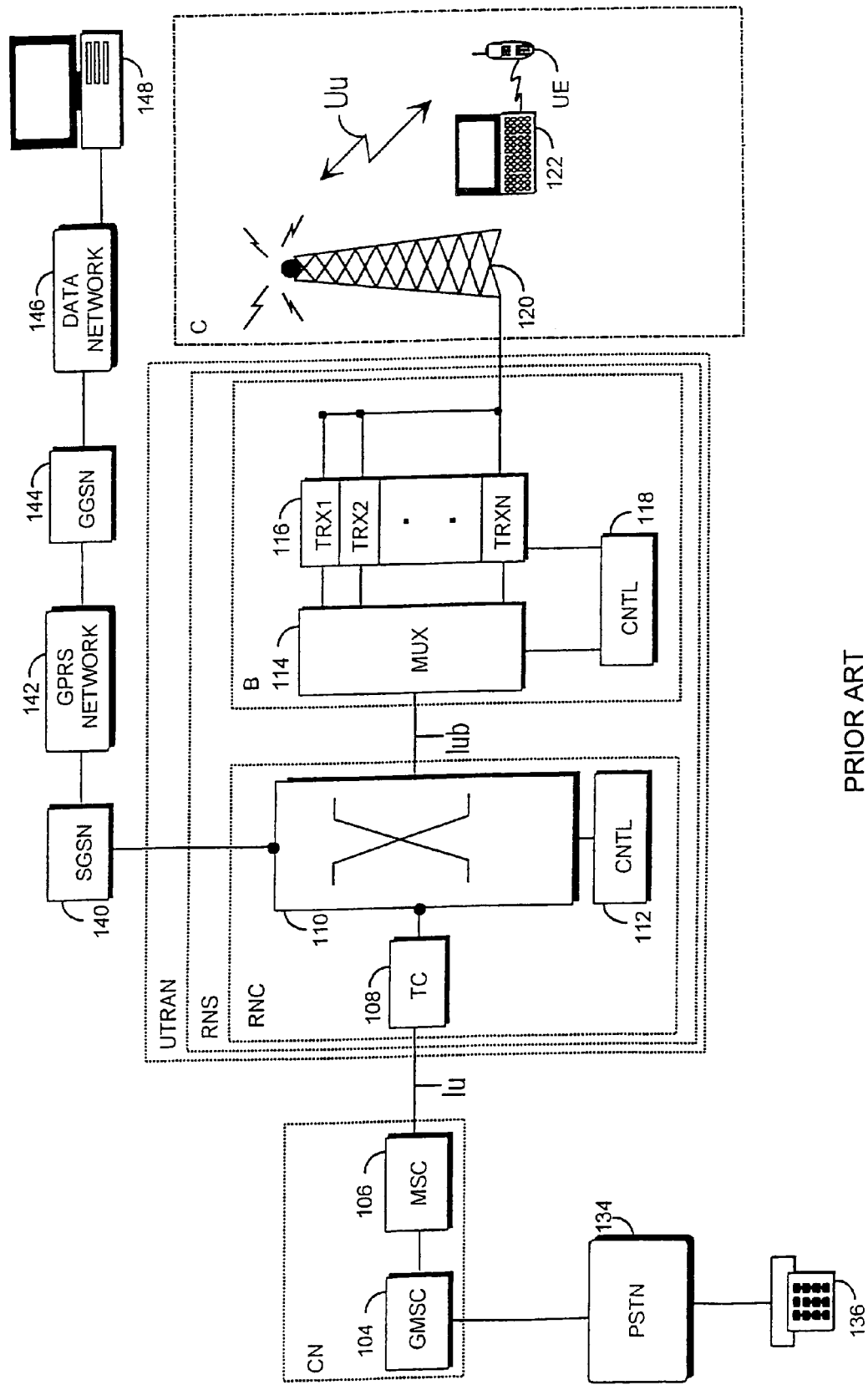
Figure 2:
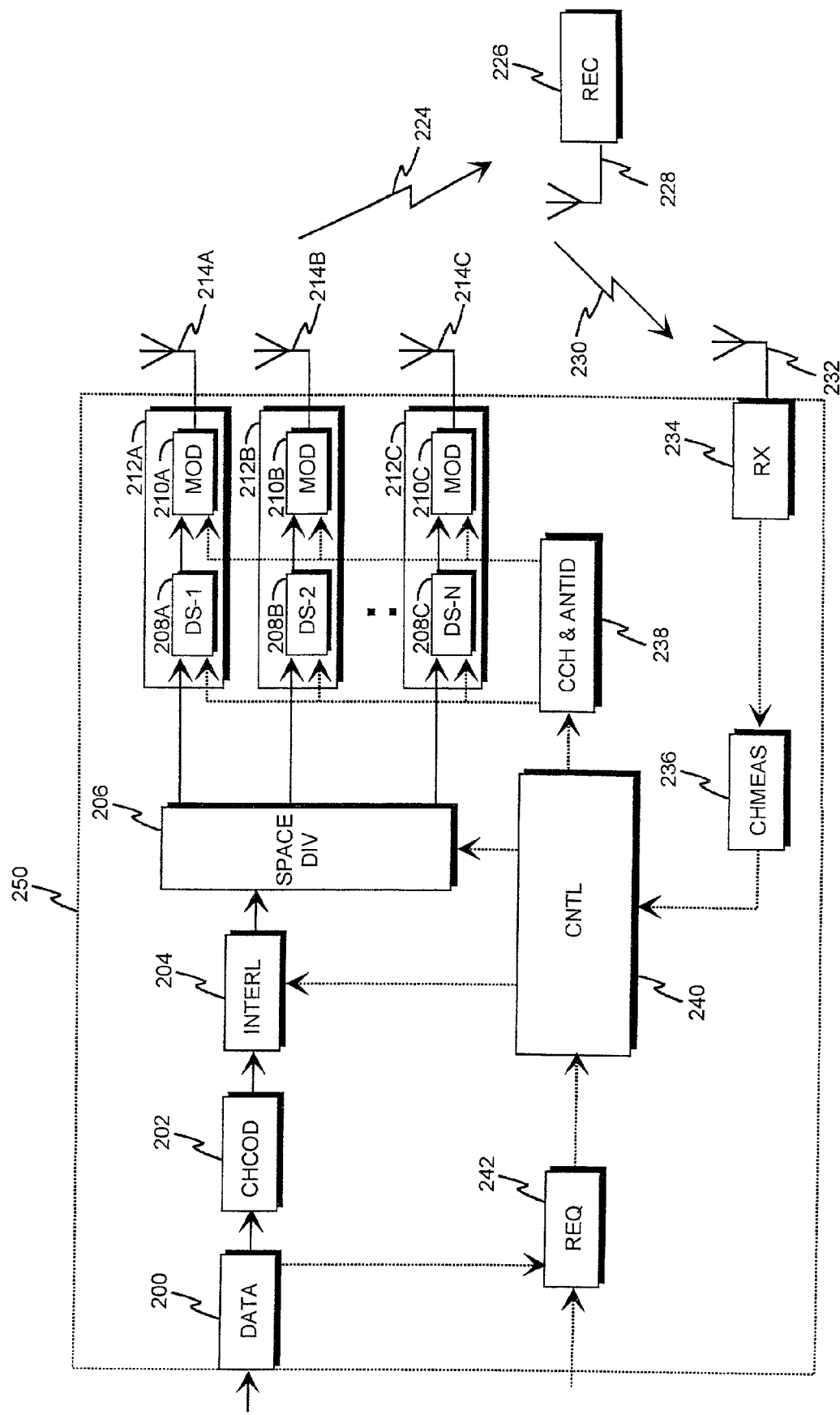
Figure 3:
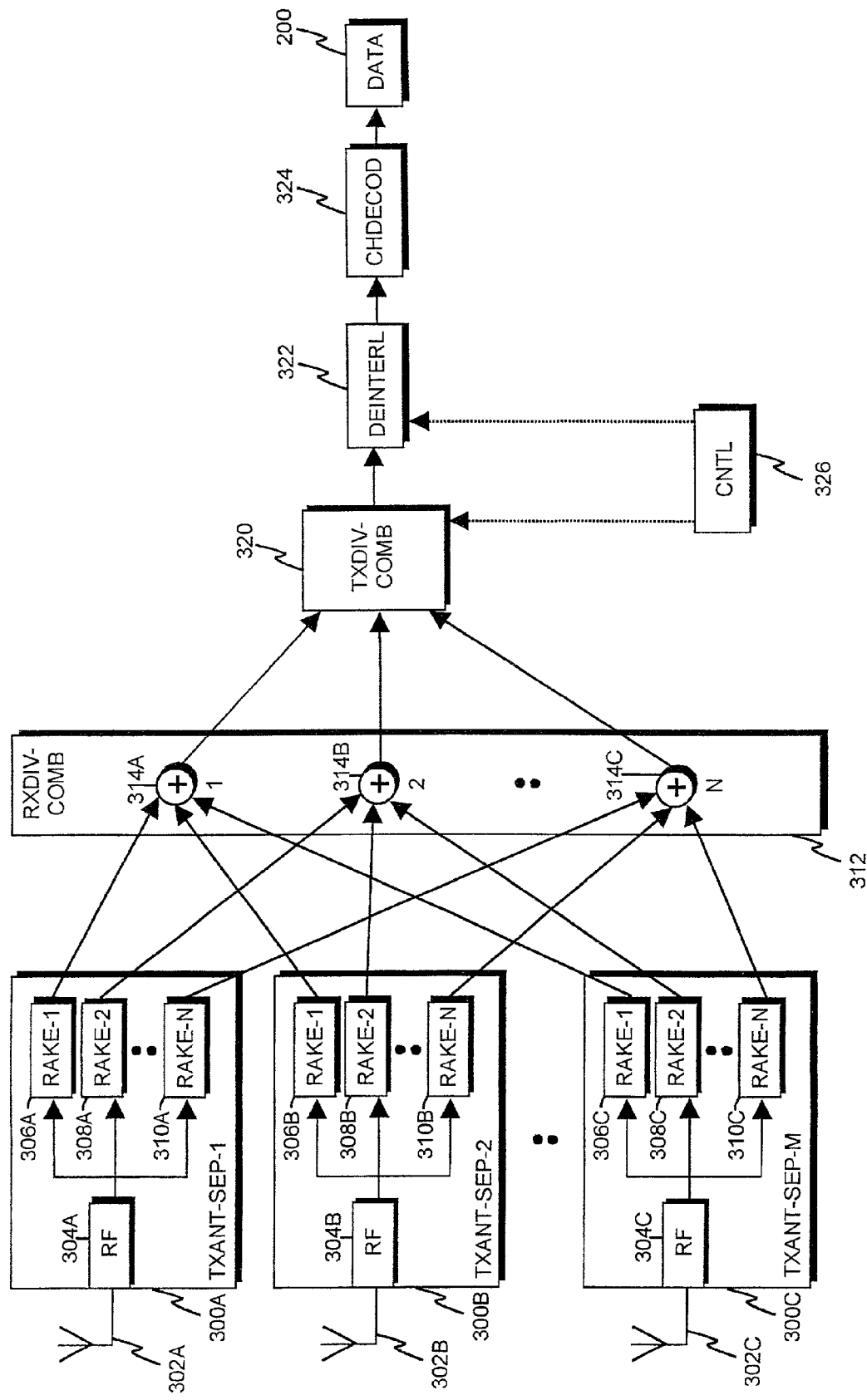
Figure 4:
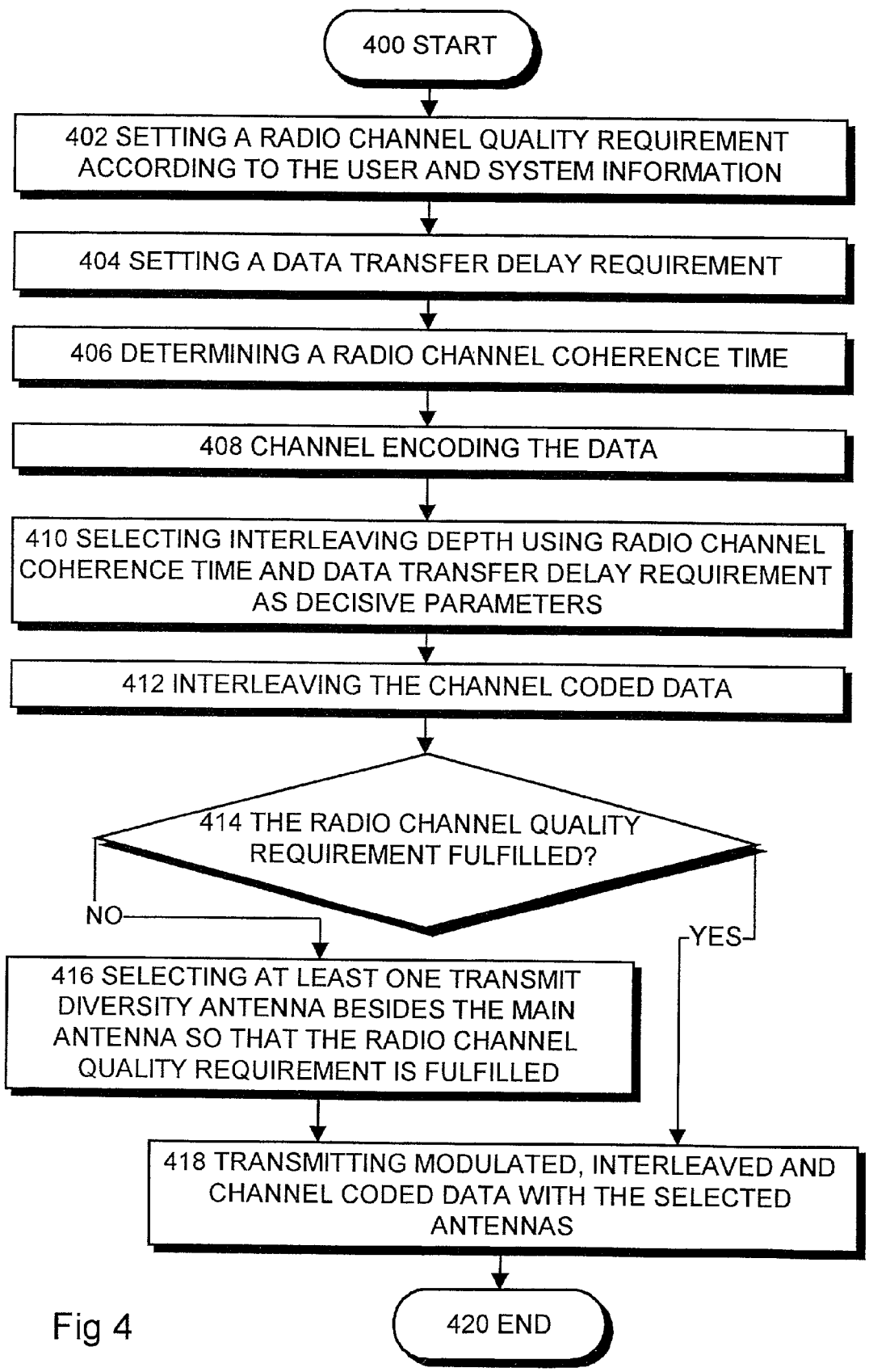

Embodiments of the present invention are described below, by way of example only, with reference to the attached drawings, in which
FIGS. 1A and 1B illustrate an example of a radio system;
FIG. 2 illustrates a transmitter;
FIG. 3 illustrates a receiver;
FIG. 4 is a flow diagram illustrating a method of transmitting data in a radio channel from a transmitter to a receiver.

THE DESCRIPTION OF EMBODIMENTS

In the following examples, embodiments of the invention are described in the Universal Mobile Telephone System (UMTS) without restricting the invention to it.

With reference to FIGS. 1A and 1B, a typical mobile telephone system structure will be described. FIG. 1B only comprises the blocks that are essential for the description of the invention, although it is apparent to a person skilled in the art that a common mobile telephone system also comprises other functions and structures which need not be discussed in greater detail here. The main parts of the mobile telephone system are: a core network CN, a UMTS terrestrial radio access network UTRAN, and a user equipment UE. The interface between the CN and the UTRAN is called the Iu interface, and the interface between the UTRAN and the UE is called the Uu interface.

The UTRAN is composed of radio network subsystems RNS. The interface between two RNSs is called the Iur interface. The RNS is composed of a radio network controller RNC and one or more node Bs B. The interface between the RNC and the node B is called the Iub interface. The reception area of the node B, i.e. a cell, is denoted in FIG. 1A with a C.

As the presentation in FIG. 1A is very abstract, it is clarified in FIG. 1B by setting forth the parts of the GSM system that correspond with the parts of the UMTS. It is clear that the presented mapping is by no means binding but an approximation, because the responsibilities and functions of the parts of the UMTS are still under heavy planning.

FIG. 1B illustrates circuit switched transmission from a telephone 136 to a user equipment UE. The user equipment UE may be a fixedly mounted wireless local loop terminal, a vehicle-mounted terminal or a hand-held portable terminal, for example.

The infrastructure of the radio network UTRAN is composed of radio network subsystems RNS, i.e. base station subsystems. The radio network subsystem RNS is composed of a radio network controller RNC, i.e. a base station controller, and at least one node B, i.e. a base station, under the control of the RNC.

The base station B comprises a multiplexer 114, transceivers 116, and a control unit 118 which controls the operation of the transceivers 116 and the multiplexer 114. The multiplexer 114 arranges the traffic and control channels used by a plurality of transceivers 116 to a single transmission connection Iub.

The transceivers 116 of the base station B have a connection to an antenna unit 120 which is used for providing a bi-directional (or sometimes one-way) radio connection Uu to a user equipment UE. The structure of the frames transmitted in the radio connection Uu is determined in detail and the connection is referred to as an air interface.

The base station controller RNC comprises a group switching field 110 and a control unit 112. The group switching field 110 is used for switching speech and data and for connecting signaling circuits. The base station B and the base station controller RNC form a base station sub system which additionally comprises a transcoder, also known as a speech codec, or TRAU (Transcoder and Rate Adapter Unit) 108.

The division of functions and the physical structures of the base station controller RNC and the base station B may differ according to the actual realization of the base station sub-system. Typically, the base station B implements the radio connection. The base station controller RNC typically manages the following: radio resource control, inter-cell handover control, power control, timing and synchronization, and paging of user equipments.

The transcoder 108 is usually located as close to a mobile switching center 106 as possible because this allows speech to be transmitted between the transcoder 108 and the base station controller RNC in a cellular radio network form, which saves transmission capacity.

The transcoder 108 converts different digital speech coding modes used between a public switched telephone network and a cellular radio network, to make them compatible, for instance from the 64 kbit/s fixed network form to another form (such as 13 kbit/s) of the cellular radio network, and vice versa. Naturally, the transcoding is carried out only for speech. The control unit 112 carries out call control, mobility management, collection of statistical data and signaling.

The core network CN is composed of the infrastructure belonging to the mobile telephone system and not being part of the UTRAN. FIG. 1B illustrates two equipments, which are part of the core network CN, namely a mobile switching center 106 and a gateway mobile switching center 104, which handles mobile telephone system interfaces towards the outside world, in this example towards the Public Switched Telephone Network 134.

The essential parts of the user equipment UE are: an interface to the antenna of the user equipment UE, a transceiver, a control part of the user equipment UE, an interface to the battery, and a user interface comprising a display, a keyboard, a microphone and a speaker.

The system can also employ packet switched transmission equipment, such as GPRS (General Packet Radio Service). GPRS (General Packet Radio Service) is a service, where air interface capacity not used in circuit-switching is employed for packet transmission. As the GPRS is a GSM based emerging service no details on the fitting of it with the UMTS will be given.

As FIG. 1B shows the switching field 110 can perform switching (depicted by black spots) to a public switched telephone network (PSTN) 134 through the mobile services switching centre 106 and to a packet transmission network 142. A typical terminal 136 in the public switched telephone network 134 is an ordinary or an ISDN (Integrated Services Digital Network) phone.

The connection between the packet transmission network 142 and the switching field 110 is established by a support node (SGSN= Serving GPRS Support Node) 140. The aim of the support node 140 is to transfer packets between the base station system and a gateway node (GGSN= Gateway GPRS Support Node) 144, and to keep record of the location of the subscriber terminal UE within its area.

The gateway node 144 connects the packet transmission network 142 and a public packet transmission network 146. An Internet protocol or an X.25 protocol can be used at the interface. By encapsulating the gateway node 144 hides the internal structure of the packet transmission network 142 from the public packet transmission network 146, so for the public packet transmission network 146 the packet transmission network 142 resembles a sub-network, the public packet transmission network being able to address packets to the subscriber terminal UE placed therein and to receive packets therefrom.

The packet transmission network 142 is typically a private network using an Internet protocol carrying signaling and user data. The structure of the network 142 may vary operator-specifically regarding the architecture and protocols below the Internet protocol layer.

The public packet transmission network 146 may be, for example, a global Internet, to which a terminal 148, for example a server computer, with a connection thereto wants to transfer packets to the subscriber terminal UE.

FIG. 2 illustrates the simplified structure of an adaptive radio transmitter 250 according to the invention. The radio transmitter 250 may be located in the node B or in the user equipment. Correspondingly the radio receiver 226 may be located in the user equipment or in the node B.

The purpose is to use an adaptive scheme in order to achieve a determined level of quality by flexible allocation of the available diversity resources. Quality represents here a figure of merit of the link performance and the processing delay required to attain that required performance. Adaptivity can be carried out continuously or on a connection basis. In the former, the used coding scheme can be changed on the basis of a time slot, a burst or a packet and, in the latter, the coding scheme is selected when a new connection is to be established. The used time and space interleaving levels are transmitted to the receiver 226 either on connection basis or frame/packet basis.

Data 200 of different services placed in a radio channel includes for example speech, data, moving video, or still video picture, and the control channels of the system that are processed in the control part 240 of the radio transmitter. The control part 240 is related to the control of the equipment itself and to the control of the connection. Different services call for different source encoding equipment, for example speech requires a speech codec. Source encoding equipment is, however, not presented in FIG. 2 for the sake of clarity.

The data 200 is channel encoded in a channel coder 202. One form of channel coding is different block codes, of which one example is cyclic redundancy check or CRC. Another typical way of performing channel coding is convolutional coding and its different variations, such as punctured convolutional coding. In WCDMA also concatenated convolutional coding (turbo coding) is used.

Having been channel encoded, the channels are interleaved in an interleaver 204. The interleaver 204 is in principle a conventional interleaving block in which the interleaving depth can be selected from a finite number of possible values $d_I$. The way in which the interleaving depth is selected will be explained later. Suffice it to say that the control part 240 contains the coding scheme decision algorithm which controls the operation of the interleaver 204 and the operation of a space diversity block 206.

The control part 240 receives information regarding the quality and delay requirements of the data 200 from a block 242. The block 242 comprises transfer delay means 242 for detecting a data transfer delay requirement, and quality means 242 for detecting a radio channel quality requirement according to requirements of the data to be sent. The control part 240 can also receive network level information from the block 242.

Also the detailed operation of the space diversity block 206 will be explained later but in principle the unit is a block that realizes the space interleaving, i.e. the use of diversity antennas in the transmission.

After the adaptive coding process the signal corresponding to each selected antenna 214A, 214B, 214C is individually identified by a unique signature, such as a particular distinctive spreading code. Each signal 208A, 208B, 208C having a different signature will be sent using one transmit block 212A, 212B, 212C. Each transmit block 212A comprises a modulation block 210A for transmitting modulated, interleaved and channel coded data in a radio channel, and the modulation block 210A is connected to an antenna 214A. The number of transmit blocks 212A, 212B, 212C is N.

At this stage, any control information associated with the antenna 214A, 214B, 214C can also be attached to the data stream. Signature operation and addition of control information are performed by a block 238, which in turn is controlled by the control part 240.

In the modulation block 210A the signal is modulated, for example it is spread with a spreading code. The modulation block 210A may comprise power amplifiers and bandwidth-restricting filters. An analog radio signal is then transmitted through the selected antennas 214A, 214B, 214C to the radio path 224.

The radio transmitter 250 also comprises a radio receiver 234, which is used to realize the other half 230 of the bi-directional radio connection. An interesting feature of the invention is also the possibility of measuring information from the incoming radio connection with the channel measurement block 236, which conveys the measured information to the control part 240. The block 236 comprises coherence time means 236 for determining a radio channel coherence time.

The function of the space diversity block 206 is to provide the adaptive spatial interleaving capability to the coding scheme. The adaptive temporal interleaving has been previously done in the interleaver 204 as discussed above. The temporal interleaver 204 output is a data stream with a given interleave depth, chosen by the coding scheme decision algorithm 240. The core operation in the space diversity block 206 is the mapping of the serial bit data stream into a parallel spatially coded signal vector associated with the transmitting antennas 214A, 214B, 214C. The bit mapping can be done by means of a data mapping matrix M, where M is a square binary matrix of dimension N. Considering the data bit vector with the last N bits from the temporal interleaver as $d=[d_1,d_2,\ldots,d_N]^T$, then the output vector after the mapping operation is $$s=Md, \quad (3)$$

where s is a Nx1-vector whose $k^{th}$ element is the bit to be fed to the $k^{th}$ transmitting antenna.

To observe how the mapping law operates on the input vector d, an example is shown next. In order to map the $i^{th}$ bit to the $j^{th}$ antenna the $i^{th}$ element of the $j^{th}$ column of matrix M is 'one' and the rest of the column elements are 'zero'. If M=8, $d_1$, is transmitted from antennas 1, 2 and 3, $d_2$ is transmitted from antenna 4, $d_3$ is transmitted from antenna 5 and $d_5$ is transmitted from antennas 7 and 8, M results in

| 1 | 0 | 0 | 0 | 0 | 0 | 0 | 0 |
|---|---|---|---|---|---|---|---|
| 1 | 0 | 0 | 0 | 0 | 0 | 0 | 0 |
| 1 | 0 | 0 | 0 | 0 | 0 | 0 | 0 |

-continued

| 0 | 1 | 0 | 0 | 0 | 0 | 0 | 0 |
|---|---|---|---|---|---|---|---|
| 0 | 0 | 1 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 1 | 0 | 0 | 0 |

It is easy to see that $s=Md=[b_1,b_1,b_1,b_2,b_3,0,b_5,b_5]^T$.

As a simple rule it can be said that the bit mapping is carried out as follows: If the $j^{th}$ antenna is used then the $j^{th}$ row of M must contain a single 'one'. The place of 'one' indicates the corresponding bit that will be transmitted from the $j^{th}$ antenna. If the $j^{th}$ row is an all-zero vector, then the $j^{th}$ antenna is not used. In a similar manner, the columns of M indicate the bits to be transmitted. There could be more than one 'one' per column. 'One' in the $j^{th}$ position of the $i^{th}$ column indicates that bit $b_1$ will be transmitted from the $j^{th}$ antenna. If the $i^{th}$ row is an all-zero vector, then the $i^{th}$ bit is not currently transmitted. Any combination of the available bits in the available antennas can be achieved by appropriate selection of entries in matrix M.

Basically, the coding scheme decision algorithm 240 determines the elements of matrix M. In order to do so, multiple inputs are taken into account, as shown in Table 1. In the present explanation both channel measurements as well as quality requirements will be mainly considered as the most relevant input on the basis of which the decisions will be made.

Therefore the coding scheme decision algorithm in the control part 240 comprises interleaving selection means 240 for selecting the interleaving depth using the radio channel coherence time and the data transfer delay as decisive parameters. The interleaving selection means 240 obtain an input from the coherence time means 236 and transfer delay means 242, and the interleaving selection means 240 give the interleaving depth as an input to the interleaver 204. The coding scheme decision algorithm 240 also comprises antenna diversity selection means 240 for selecting at least one transmit diversity antenna besides the main antenna if the radio channel quality requirement is not fulfilled, so that the radio channel quality requirement will be fulfilled. The antenna diversity selection means 240 obtain the radio channel quality requirement as an input from the quality means 242, and the antenna diversity selection means 240 give the selected transmit blocks 212A, 212B as an input to the space diversity block 206.

The control unit 240 controls the blocks that are connected to it with a broken arrow-headed line. The invention is preferably implemented by software, but also an ASIC (Application Specific Integrated Circuit) or some other HW implementation is of course possible. A hybrid implementation consisting of HW and SW is possible. The channel coder 202, the interleaver 204, the space diversity block 206, the coherence time means 236, the transfer delay means 242, the interleaving selection means 240, the quality means 242, and the antenna diversity selection means 240 can consequently be software modules residing in the processor of the transmitter 250.

The method according to the invention is presented in FIG. 4. The performance of the method begins in block 400.

In block 402, a radio channel quality requirement according to the user and system information is set.

In block 404, a data transfer delay requirement is set.

In block 406, a radio channel coherence time is determined.

In block 408, the data is channel encoded.

In block 410, the interleaving depth is selected using the radio channel coherence time and the data transfer delay as decisive parameters.

In block 412, the channel coded data is interleaved.

In block 414 a test is performed: Is the radio channel quality requirement fulfilled? If not, then in the block 416 at least one transmit diversity antenna is selected besides the main antenna so that the radio channel quality requirement will be fulfilled, whereafter the method will continue in block 418. If the radio channel quality requirement is fulfilled, the operation is directly continued in block 418 without adding space interleaving to the signal.

In block 418, the modulated, interleaved and channel coded data is transmitted with the selected antennas. In block 420 the method is ended.

The strategy used by the transmitter 250 to select the most appropriate temporal and spatial interleaving combination for the down-link 224 is presented next as a set of six rules. It is presumed that the transmitter 250 is in the base station and the receiver 226 in the mobile station, but the rules can also be adapted for optimizing the up-link 230.

1. The quality requirements for data transfer are set by a network on the basis of the transfer mode. The mode could be real-time and non-real-time traffic with different data rates. The quality requirements are a bit error rate or a frame error rate and a transfer delay $D_{req}$.

2. In the transmitter 250 there are preset levels (or depths) of time interleaving (e.g. 10 ms, 20 ms, 30 ms, . . . , 80 ms, . . . ) and space interleaving. The estimated correlation coefficients are based on the antenna separation with a specific angular spread. If the antennas are equally separated as in a linear array, the distance between neighboring antennas corresponds to the lowest space interleaving level in the given angular spread, and the distance between the far-end antennas corresponds to the highest space interleaving level.

3. The transmitter 250 measures the reverse link (or up-link) 230 and determines on the basis of these measurements, the coherence time of the channel, which is directly related to the required interleaving depth. Optionally also the amount of the available multipath diversity and the correlation between the antenna elements can be measured. The up-link 230 information can normally be used as an approximation of the down-link information.

The coherence time $T_{coh}$ is approximately the inverse of the Doppler spread. There are several known methods to estimate the Doppler spread, and it is assumed here that such a method is used where it can be estimated with some degree of accuracy. Of course, the measuring accuracy influences the technical effect of the invention.

The amount of multipath diversity is measured by observing the number of multipath components whose power exceeds a preset level $P_{tr}$ (compared to the strongest component, for example $P_{tr}$=−19 dB) and whose distances from each other are longer than the correlation distance (about one chip for a rectangular pulse shape). The powers of the multipath components can be used to compute the possible maximum multipath combining gain $G_{mmax}$.

4. The coherence time is compared to the required transfer delay.

4.1. If the coherence time $T_{coch}$ is infinite, space interleaving is applied, i.e. at least one diversity antenna is used.

4.2. If the coherence time $T_{coh}$ is longer than the required transfer delay $D_{req}$, the amount of the multipath diversity is estimated. This estimation of multipath diversity is an optional feature. It optimizes the use of radio resources since time and/or space interleaving can be reduced if there exists enough multipath diversity in the receiver 226.

4.2.1. If there is no multipath diversity ($G_{mmax} \leq G_{tr}$, see below for the definition of $G_{tr}$) and the channel is fading, the time interleaving level is set to correspond to the required transfer delay, so that the selected time interleaving depth $d_I \leq T_{coch}$. The space interleaving level $m_j$ is selected such that the effective correlation value between two successive symbols is below a predefined threshold level $C_{tr}$. The effective correlation value is calculated from the time interleaving depth and the space interleaving value. The predefined threshold level guarantees a given level of decorrelation between successive symbols so that after the decoding the required error performance can be achieved in conjunction with the closed loop power control.

4.2.2. If the multipath diversity gain $G_{mmax} \geq G_{mtr}$ in conjunction with the time interleaving depth $d_I \leq T_{coch}$, the data is transmitted with only one antenna. The threshold gain $G_{mtr}$ is preset such that in conjunction with the time interleaving depth $d_I$ and with the closed loop power control the required error performance can be achieved after the decoding.

4.3. If the coherence time $T_{coch}$ is shorter than the required transfer delay $D_{req}$, the time interleaving level is set to correspond to the coherence time i.e. $d_I \leq T_{coch}$. The amount of the multipath diversity is estimated.

4.3.1. If there is no multipath diversity ($G_{mmax} \leq G_{tr}$), the antennas are used to create artificial multipath diversity so that the achieved multipath combining gain $G_{mach}$ in conjunction with the time interleaving depth $d_I$ guarantees the required error performance after the decoding with the closed loop power control.

4.3.2. If there is enough multipath diversity ($G_{mmax} \geq G_{mtr}$), the data is transmitted with only one antenna.

5. The coded data sequence is interleaved with the selected time interleaving depth $d_I$, and the antenna mapping is implemented depending on the selected space interleaving level $m_j$ or the transmit diversity level. In the space interleaving, successive bits are assigned to different antenna elements $a_k$. In the transmit diversity a single bit is assigned to multiple antenna elements $a_k, \ldots a_{k+n}$. This is easily done by appropriate filling of the mapping matrix M.

6. An antenna is identified by either assigning a special spreading code to each bit transmitted from the antenna or by including different pilot symbols to each bit or sequence of bits transmitted from the antenna in question.

The code scheme decision presented above is mainly driven by the up-link measurements. The purpose is to attain a desired link quality level. In addition, other user and network information can also be incorporated into the decision process. This user and network information includes: base station information such as availability of processing resources, hardware limitations (e.g. power amplifier loading), hardware failures (e.g. upon failure in a given transmitting branch, the base station will rearrange the transmitting scheme avoiding service interruption), network information such as priority of some users/services and co-channel user information, feedback information from the mobile station, for example a coding decision can be also done by the mobile station, or alternatively a joint decision can be made by both the base station and the mobile station.

So far only the transmitter 250 side has been presented and analyzed. Next, an adaptive receiver 226 capable of handling the signal transmitted by the adaptive transmitter 250 will be presented with reference to FIG. 3. At this point it is emphasized that the coding scheme to be used is finally determined by the transmitting end but the selected scheme must be readily informed to the receiving end. Down-link dedicated control channels can be used to transfer information on any change in the used coding scheme.

The proposed method can be used with a generic M-antenna receiver, where $M \geq 1$ The receiver is thus either a single antenna receiver or a multiple antenna receiver.

The receiver must detect the used temporal and spatial interleaving levels before detecting data bits, and it must configure itself. This is done by a control part 326, which receives the information from the control channels or it finds out the information by using blind detection.

Each antenna 302A, 302B, 302C receives symbols transmitted from N different antennas 214A, 214B, 214C. If specific codes are used to provide identification, corresponding despreading blocks are used to rearrange the space-interleaved bits back to the original order or to allow the maximal ratio combining, if the transmit diversity is used. If pilot symbols are used for identification, these symbols must be detected before the data bits can be handled. In this case the received signal must be buffered.

FIG. 3 represents a possible receiver used in a CDMA radio system. It employs M transmit antenna separation blocks 300A, 300B, 300C each of which is connected to one antenna. If no receiver antenna diversity is used, then only one transmit antenna separation block 300A exists.

The radio receiver is typically a Rake receiver. The analog radio signal is received from the radio path by an antenna. The received signal is conveyed to radio frequency parts 304A, 304B, 304C that comprise a filter which blocks frequencies outside the desired frequency band. A signal is then converted into an intermediate frequency or directly into baseband, and in this form the signal is sampled and quantized. Because the signal in question is a multipath propagated signal, efforts are made to combine the signal components that have propagated in different multipaths in a block which comprises several Rake fingers. In a rowing Rake finger, the delays for the different multipath-propagated signal components are searched. After the delays have been found, different Rake fingers are allocated for receiving each multipath-propagated signal by correlating the received signal with the used spreading code delayed with the found delay of the particular multipath. The different demodulated and despread multipaths of the same signal are then combined in order to get a stronger signal.

Each transmit antenna separation block 300A, 300B, 300C comprises N Rake receivers, the number N of which corresponds to the number of the transmit antennas 214A, 214B, 214C used by the transmitter 250. Each Rake receiver 306A, 308A, 310A is matched to a particular antenna 214A, 214B, 214C code. Therefore each of the $i^{th}$ combining networks (i= 1,2, . . . ,N) 314A, 314B, 314C in the receive diversity combining block 312 will have M inputs. The output of the $i^{th}$ combining network 314A, 314B, 314C represents the combined M-order diversity signal of the $i^{th}$ transmitting antenna.

In a transmit diversity combining block 320, the used space interleaving is deinterleaved. Then the signal is time-deinterleaved in a deinterleaver 322. After this the channel coding can be decoded in a channel decoder 324 to recover the original data 200. For example convolutional coding is advantageously decoded with a Viterbi decoder. The receiver of the invention is also preferably implemented by software, but hardware implementation is also possible as with the transmitter.

Even though the invention is described above with reference to an example shown in the attached drawings, it is apparent that the invention is not restricted thereto, but it can vary in many ways within the inventive idea disclosed in the attached claims.

What is claimed is:

1. A method of transmitting data in a radio channel from a transmitter to a receiver, the method comprising:
    setting a radio channel quality requirement according to a user and system information;
    setting a data transfer delay requirement;
    determining a radio channel coherence time;
    channel encoding the data;
    selecting interleaving depth using the radio channel coherence time and the data transfer delay as decisive parameters;
    interleaving the channel coded data;
    when the radio channel quality requirement is not fulfilled, selecting at least one transmit diversity antenna besides the main antenna so that the radio channel quality requirement will be fulfilled;
    transmitting modulated, interleaved and channel coded data with the selected antennas.

2. A method as claimed in claim 1, wherein the radio channel quality requirement is expressed as a bit error rate or a frame error rate.

3. A method as claimed in claim 1, wherein the interleaving depth is selected among predefined levels, and the antennas are selected using as parameters estimated correlation factors between the antennas.

4. A method as claimed in claim 1, wherein the radio channel coherence time is specified as the inverse of the Doppler Spread.

5. A method as claimed in claim 1, wherein the multipath diversity combining gain of the radio channel is also taken into account when the interleaving depth is being selected.

6. A method as claimed in claim 5, wherein, when the multipath diversity combining gain is being calculated the multipath components whose reception power exceeds a predefined threshold and whose distances from each other are longer than the correlation distance are taken into account.

7. A method as claimed in claim 1, wherein the antennas are used such that successive bits are assigned to different antennas.

8. A method as claimed in claim 1, wherein the antennas are used such that the same bit is assigned to at least two different antennas.

9. A method as claimed in claim 1, wherein transmission through each antenna contains a unique signature, such as a spreading code or a pilot symbol sequence.

10. A method as claimed in claim 1, wherein the used interleaving depth is signaled to the receiver at the beginning of the radio connection on the radio channel.

11. A method as claimed in claim 1, wherein the used interleaving depth is signaled to the receiver for each frame or packet of the radio channel.

12. A method as claimed in claim 1, wherein the interleaved and channel coded data is mapped to the antennas by a square binary matrix.

13. A method as claimed in claim 12, wherein the square binary matrix is of dimension N, in which:
    N is the number of the antennas;
    each row of the matrix corresponds to one antenna;
    each column of the matrix corresponds to one bit to be sent;
    value 'one' in a matrix position denotes that the column bit is sent by means of the antenna of the row; and value 'zero' in a matrix position denotes that the column bit is not sent by means of the antenna of the row.

14. A method as claimed in claim 1, wherein when the radio channel coherence time is infinite, the interleaving depth is set to zero and at least one diversity antenna is used.

15. A method as claimed in claim 1, wherein the interleaving depth is set to correspond to the data transfer delay, and the number of the antennas is selected such that an effective correlation value between two successive symbols is below a predefined threshold level.

16. A method as claimed in claim 1, wherein the user and system information comprises:
parameters related to the receiver, such as the antenna combining gain of the receiver using more than one antenna; or
parameters related to the radio system, such as priorities among different users, priorities among different services, information regarding interference sources; or
parameters related to the transmitter, such as hardware limitations, availability of processing resources, hardware failure.

17. A radio transmitter comprising:
a channel coder for channel encoding data to be sent;
an interleaver, connected to the channel coder, for interleaving the channel coded data;
a space diversity block connected to the interleaver;
at least two transmit blocks connected to the space diversity block;
a transmit block comprising a modulation block for transmitting modulated, interleaved and channel coded data in a radio channel, and an antenna connected to the modulation block;
coherence time means for determining a radio channel coherence time;
transfer delay means for detecting a data transfer delay requirement;
interleaving selection means for selecting an interleaving depth using the radio channel coherence time and the data transfer delay as decisive parameters, the interleaving selection means obtaining an input from the coherence time means and the transfer delay means, and interleaving selection means giving interleaving depth as an input to the interleaver;
quality means for detecting a radio channel quality requirement according to the user and system information; and
antenna diversity selection means for selecting at least one transmit diversity antenna besides the main antenna when the radio channel quality requirement is not fulfilled, so that the radio channel quality requirement will be fulfilled, the antenna diversity selection means obtaining the radio channel quality requirement as an input from the quality means, and the antenna diversity selection means giving the selected transmit blocks as an input to the space diversity block.

18. A radio transmitter as claimed in claim 17, wherein the radio channel quality requirement is expressed as a bit error rate or a frame error rate in the quality means.

19. A radio transmitter as claimed in claim 17, wherein the interleaving depth is selected among predefined levels defined in the interleaving selection means, and the antennas are selected using as parameters estimated correlation factors between the antennas defined in the antenna diversity selection means.

20. A radio transmitter as claimed in claim 17, wherein the radio channel coherence time is specified as the inverse of the Doppler Spread in the coherence time means.

21. A radio transmitter as claimed in claim 17, wherein the transmitter further comprises a channel measurement block, and the measured multipath diversity combining gain of the radio channel is also taken into account when the interleaving depth is being selected in the interleaving selection means.

22. A radio transmitter as claimed in claim 21, wherein, when the multipath diversity combining gain is being calculated the multipath components whose reception power exceeds a predefined threshold and whose distances from each other are longer than the correlation distance are taken into account.

23. A radio transmitter as claimed in claim 17, wherein the antennas are used such that successive bits are assigned to different antennas in the antenna diversity selection means.

24. A radio transmitter as claimed in claim 17, wherein the antennas are used such that the same bit is assigned to at least two different antennas in the antenna diversity selection means.

25. A radio transmitter as claimed in claim 17, wherein the transmitter further comprises means for adding to the transmission through each antenna a unique signature, such as a spreading code or a pilot symbol sequence.

26. A radio transmitter as claimed in claim 17, wherein the transmitter further comprises means for signaling the used interleaving depth to the receiver at the beginning of the radio connection on the radio channel.

27. A radio transmitter as claimed in claim 17, wherein the transmitter further comprises means for signaling the used interleaving depth to the receiver for each frame or packet of the radio channel.

28. A radio transmitter as claimed in claim 17, wherein the interleaved and channel coded data is mapped to the antennas by a square binary matrix located in the space diversity block.

29. A radio transmitter as claimed in claim 28, wherein the square binary matrix is of dimension N, in which:
N is the number of the antennas;
each row of the matrix corresponds to one antenna;
each column of the matrix corresponds to one bit to be sent;
value 'one' in a matrix position denotes that the column bit is sent by means of the antenna of the row;
value 'zero' in a matrix position denotes that the column bit is not sent by means of the antenna of the row.

30. A radio transmitter as claimed in claim 17, wherein when the radio channel coherence time is infinite in the coherence time means, the interleaving depth is set to zero in the interleaving selection means and at least one diversity antenna is used in the antenna diversity selection means.

31. A radio transmitter as claimed in claim 17, wherein the interleaving depth is set to correspond to the data transfer delay in the interleaving selection means, and the number of the antennas is selected in the antenna diversity selection means such that an effective correlation value between two successive symbols is below a predefined threshold level.

32. A radio transmitter as claimed in claim 17, wherein the user and system information in the quality means comprises:
parameters related to the receiver, such as the antenna combining gain of the receiver using more than one antenna; or
parameters related to the radio system, such as priorities among different users, priorities among different services, information regarding interference sources; or
parameters related to the transmitter, such as hardware limitations, availability of processing resources, hardware failure.

* * * * *